Oct. 16, 1962  F. L. HAUSHALTER  3,058,208
METHOD OF MAKING A VIBRATION DAMPENER
Original Filed Jan. 26, 1959  2 Sheets-Sheet 1
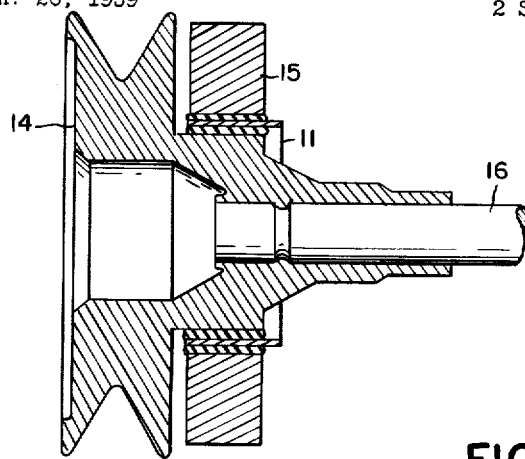
FIG.1.
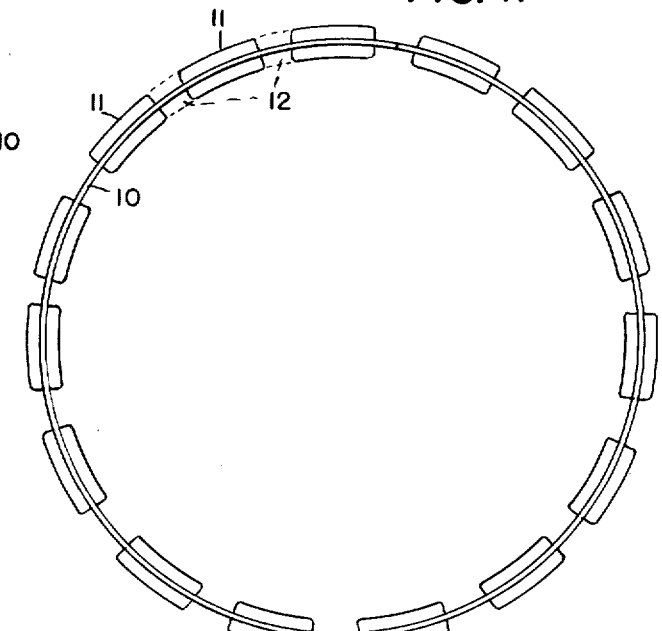
FIG.4.
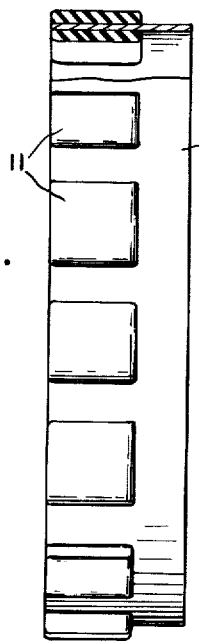
FIG.5.
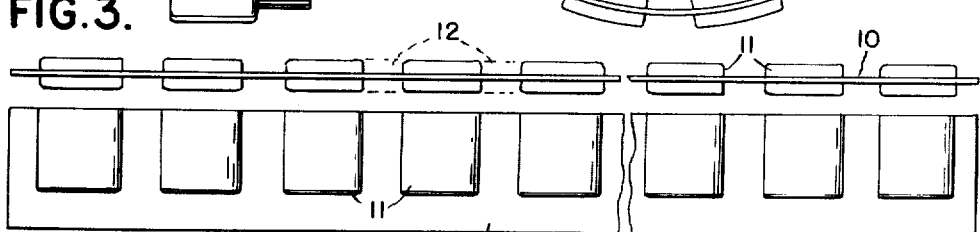
FIG.3.
FIG.2.
INVENTOR.
FRED L. HAUSHALTER
BY
Whittemore, Hulbert & Belknap
ATTORNEYS Oct. 16, 1962 — F. L. HAUSHALTER — 3,058,208
METHOD OF MAKING A VIBRATION DAMPENER
Original Filed Jan. 26, 1959 — 2 Sheets-Sheet 2
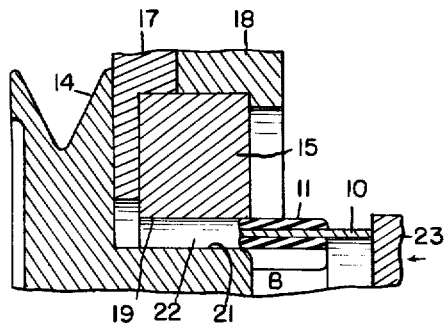
FIG. 6.
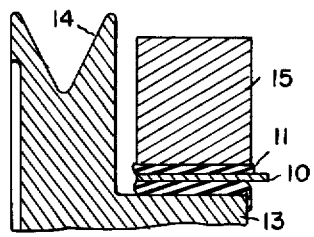
FIG. 7.
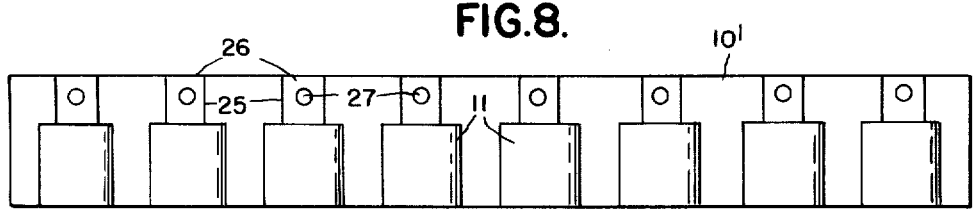
FIG. 8.
FIG. 9.
FIG. 10.
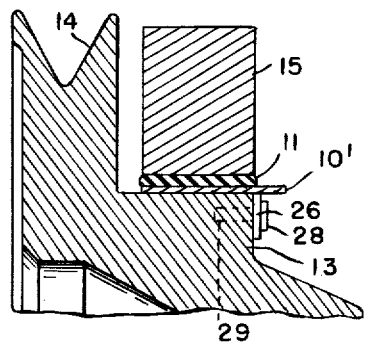
INVENTOR.
FRED L. HAUSHALTER
BY
Whittemore, Hulbert & Belknap
ATTORNEYS

United States Patent Office 3,058,208
Patented Oct. 16, 1962

3,058,208
METHOD OF MAKING A VIBRATION DAMPENER
Fred L. Haushalter, 2185 Scott Lake Road, Pontiac, Mich.
Original application Jan. 26, 1959, Ser. No. 789,027, now Patent No. 2,977,819, dated Apr. 4, 1961. Divided and this application Mar. 14, 1960, Ser. No. 14,714
2 Claims. (Cl. 29—451)

This invention relates generally to a method of making a vibration dampener, and refers more particularly to a method of making a vibration dampener having spaced apart inner and outer relatively rotatable members provided with opposed cylindrical surfaces concentric with the axis of rotation of said members and having a yieldable connection between said rotatable members disposed within the annular space between said cylindrical surfaces and comprising a bodily inserted composite unit.

This application constitutes a division of my application filed January 26, 1959, bearing Serial No. 789,027, now Patent No. 2,977,819.

One of the essential objects of the invention is to provide a method of making a vibration dampener wherein the composite unit is preformed before being bodily inserted into the annular space between the opposed substantially concentric surfaces of the spaced apart inner and outer relatively rotatable members.

Another object is to provide a method of making a vibration dampener wherein the composite unit is so formed that it can be easily and quickly inserted into the annular space mentioned.

Another object is to provide a method of making a vibration dampener wherein the composite unit includes elastic material that is adapted to be stretched axially and temporarily made thinner than the radial width of said annular space during insertion of the unit into said space.

Another object is to provide a method of making a vibration dampener wherein uniformity of stretch or stress in said elastic material may be obtained when said unit is inserted into said annular space, regardless of how much the width of the opposed concentric surfaces may exceed the width of said elastic material.

Another object is to provide a method of making a vibration dampener wherein the composite unit includes a relatively thin substantially annular metal strip that may constitute the means by which the composite unit, including the elastic material may be inserted into the annular space between the opposed substantially concentric surfaces of the spaced apart inner and outer relatively rotatable members.

Another object is to provide a method wherein the elastic material comprises individual slabs formed separately from each other which are permanently bonded to one or both sides of the metal strip mentioned to complete the composite unit before the latter is inserted into said annular space.

Another object is to provide a method wherein the yieldable connection between the rotatable members is effected solely by the insertion of the composite unit into the annular space between said members.

Another object is to provide a method wherein the combined or over-all cross sectional thickness of metal strip and elastic material bonded thereto is greater than the radial width of the annular space mentioned, whereby the elastic material is under compression between the opposed substantially concentric surfaces of said members after said unit has been inserted as aforesaid.

Other objects, advantages and novel details of construction of this invention will be made more apparent as this description proceeds, especially when considered in connection with the accompanying drawings wherein:

FIGURE 1 is a cross-sectional view of an assembly of a unit in which the vibration dampener of the invention is incorporated.

FIGURE 2 is a top plan view of the initial form of the insert employed in the invention.

FIGURE 3 is an end view of the insert shown in FIGURE 2.

FIGURE 4 is an end view of the insert shown in FIGURES 2 and 3 when bent to circular form for insertion into the assembly.

FIGURE 5 is a side view, partly in section, of the insert shown in FIGURE 4.

FIGURE 6 is a fragmentary sectional view of the insert and rotatable concentric members prior to the introduction of the insert, together with forms and the tool employed in the inserting operation.

FIGURE 7 is a fragmentary sectional view of the insert and rotatable concentric members after forced insertion of the insert into the assembly.

FIGURE 8 is a top plan view of the initial form of a modified form of insert.

FIGURE 9 is an end view of the insert shown in FIGURE 8.

FIGURE 10 is a fragmentary sectional view of the insert and concentric members after forced insertion of the insert shown in FIGURES 8 and 9 into the assembly.

In the drawings, it will be seen that the insert initially comprises a flat rectangular metal strip 10, preferably steel, to each side of which are bonded a plurality of shaped resilient elements or slabs 11 formed from rubber or other curable elastomer. These elements are securely bonded to the metal strip by curing the elements to the strip. By bonding the rubber to a thin steel band, either in a continuous band or in sections, the pressure of vulcanization is at right angles to the plane of the metal, or directly down on the metal, so that a good bond is obtained. Then again, a better bond is obtained on steel than on cast iron. The steel band with the bonded rubber can be bent around the hub member. This is preferable to bonding a continuous ring of rubber onto the inner surface of the inertia member, then pressing this onto the hub member with the aid of a lubricant. This involves quite costly molds, and, furthermore, the bonding of the rubber to the cast iron inertia member is rather uncertain. While the elastic elements are shown as being in spaced relation, the invention is not so limited, it being contemplated that under certain conditions it may be desirable to provide a continuous band of rubber or like material on only one or on opposite sides of the metal strip, as indicated by dotted lines at 12.

It will be observed in the several figures that the width of the rubber elements is somewhat less than that of the metal strips, it being intended that, after assembly, a portion of the metal strip protrude axially therefrom, as shown in FIGURE 1. The main purpose of having this portion protrude is to provide for relative movement of portions of the rubber with respect to the metal strip and for cooling the insert, there being a tendency for the rubber to become heated by the continuous deformations to which it is subjected under operating conditions.

After the rubber elements have been bonded to the flat metal strip, the combined metal and rubber insert is bent to circular form as shown in FIGURE 4, the rubber elements then being circumferentially spaced therearound. In this form it is forced into the space between the concentric surfaces of a rotatable body, such as the hub 13 of pulley 14, and an inertia member 15 which may be an annular mass of metal. This combination of a pulley keyed to a crankshaft 16 and an inertia member is conventional and various forms of dampening rings or the like interposed between the inertia member and a rotatable body have been employed. The present invention, therefore, resides in the novel form of yieldable insert and the manner of forming and assembling it with the rotatable members.

As shown in FIGURE 6, there is provided a fixture comprising two spacer sections 17, 18, which position the inertia member 15 with respect to the hub 13 so that the surfaces 19, 21 are maintained in concentric relation, thus providing an annular space 22 between members 13 and 15. The radial width of this space 22 is less than the combined cross-sectional thickness of the rubber elements and metal strip forming the yieldable insert. The forward face of pulley 14 is then positioned in abutting relation to a fixed frame, after which a suitable annular tool, a portion of which is indicated at 23, imposes sufficient pressure on the free edge of the metal strip 10 to force the insert into space 22. Since the radial width of this space is less than the thickness of the rubber in the insert, the rubber will be stretched a substantial amount and placed under tension as it is forced between concentric members 13 and 15. At the same time the rubber tends to assume its original form and, since it occupies a space less than that of the initial thickness of the rubber, it will also be under compression. The insert when fully introduced into the space 22, as shown in FIGURE 7, is elongated and under compression, but the tendency of the rubber to resume its initial form effects an intimate frictional bond between the insert and the concentric members 13 and 15.

In the modified embodiment of the invention illustrated in FIGURES 8, 9 and 10, the metal strip 10′ is cut at spaced intervals, as at 25, to provide tongues 26 adapted to be bent at a right angle to the remainder of the strip. Each tongue is punched to provide apertures 27 through which threaded screws 28 extend into threaded openings 29 in member 13, as shown in FIGURE 10. In this way the insert may be firmly attached to the hub 13 while the unbent portions of the annular insert between the tongues extend axially to provide for dissipation of heat resulting from deformation of the rubber bushing.

While the bonding of the rubber elements to the metal strip has been described as being effected by curing the rubber on the metal, the rubber may be adhered to the metal by other suitable methods such as by adhesives. The preferred initial step is one in which the rubber elements are bonded to a flat metal strip which is subsequently bent to circular form, but it is within the concept of the invention to bond rubber elements to a preformed continuous metal band. Other modifications within the terms of the claims are also contemplated.

What I claim as my invention is:

1. The method of making a torsion unit having spaced apart inner and outer relatively rotatable members provided with opposed cylindrical surfaces concentric with the axis of rotation of said members, and having a yieldable connection between said rotatable members disposed within the annular space between said opposed cylindrical surfaces; comprising the steps of providing a relatively thin, flat, straight, elongated flexible metal strip of predetermined length having free ends, vulcanizing longitudinally spaced rubber slabs on both surfaces of said flat strip to form a composite unit having a cross-sectional thickness in the free state of the rubber substantially greater than the radial width of the annular space between the opposed cylindrical surfaces of said rotatable members, bending said composite unit lengthwise in the arc of a circle to prestress said rubber slabs and position the opposite free ends of said strip adjacent each other in confronting relation to provide a substantially annular structure, positioning said substantially annular structure axially adjacent said annular space in substantially concentric relation therewith, and imposing on the metal strip of said substantially annular structure an axial force in a direction toward said annular space to force said substantially annular structure edgewise into said annular space, whereby the rubber of said slabs is axially stretched and tensioned and flows circumferentially into the spaces between said slabs and said substantially annular structure is placed between and in concentric relation with said opposed cylindrical surfaces with said slabs radially compressed in tight frictional engagement with said opposed cylindrical surfaces.

2. The method defined in claim 1, wherein said slabs are spaced axially from one edge of said strip, and said substantially annular structure is inserted edgewise into said annular space in a direction such that said one edge trails the other.

References Cited in the file of this patent

UNITED STATES PATENTS

| | | |
|---|---|---|
| 1,773,377 | Roberts | Aug. 19, 1930 |
| 1,854,708 | Mastin et al. | Apr. 19, 1932 |
| 2,361,139 | White et al. | Oct. 24, 1944 |
| 2,647,556 | Courtney | Aug. 4, 1953 |
| 2,723,143 | Smith | Nov. 8, 1955 |
| 2,723,706 | Carter | Nov. 15, 1955 |
| 2,795,036 | Haushalter | June 11, 1957 |